(12) United States Patent
Sudau et al.

(10) Patent No.: US 8,789,674 B2
(45) Date of Patent: Jul. 29, 2014

(54) TORQUE TRANSMISSION SYSTEM, IN PARTICULAR FOR A VEHICLE

(75) Inventors: Jörg Sudau, Niederwerrn (DE); Gregor Sueck, Coesfeld (DE); Arthur Schröder, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 116 days.

(21) Appl. No.: 13/501,548

(22) PCT Filed: Oct. 5, 2010

(86) PCT No.: PCT/EP2010/064783
§ 371 (c)(1),
(2), (4) Date: Jun. 21, 2012

(87) PCT Pub. No.: WO2011/045198
PCT Pub. Date: Apr. 21, 2011

(65) Prior Publication Data
US 2012/0261225 A1 Oct. 18, 2012

(30) Foreign Application Priority Data

Oct. 13, 2009 (DE) .......................... 10 2009 045 609

(51) Int. Cl.
*F16D 25/12* (2006.01)
(52) U.S. Cl.
USPC ........................ 192/70.12; 192/3.3; 192/113.3

(58) Field of Classification Search
USPC .............................................. 192/85.25–85.29
See application file for complete search history.

(56) References Cited

U.S. PATENT DOCUMENTS

2009/0157272 A1* 6/2009 Uhler et al. ..................... 701/67

FOREIGN PATENT DOCUMENTS

| GB | 2118643 | * | 4/1983 |
| JP | 61-189330 | * | 8/1986 |

* cited by examiner

*Primary Examiner* — David D Le
*Assistant Examiner* — Mark Manley
(74) *Attorney, Agent, or Firm* — Cozen O'Connor

(57) ABSTRACT

A torque transmission system, particularly for a vehicle, includes a housing arrangement (26) with a hub region (36) which engages in a shaft opening (22) of the gearbox housing (16) and is rotatably supported so as to be substantially fluid-tight with respect to the gearbox housing (16) by means of a bearing/seal arrangement (42); at least one first fluid port (97) which opens toward an intermediate space region (98) formed between the housing arrangement (26) and the gearbox housing (16) is provided in the housing arrangement (26) in or in the vicinity of the hub region (36), and at least one second fluid port (104) which bypasses the bearing/seal arrangement (42) and opens toward the intermediate space region (98) is provided in the gearbox housing (16) and/or in the bearing/seal arrangement (42).

15 Claims, 3 Drawing Sheets

TORQUE TRANSMISSION SYSTEM, IN PARTICULAR FOR A VEHICLE

PRIORITY CLAIM

This is a U.S. national stage of application No. PCT/EP2010/064783, filed on 5 Oct. 2010. Priority is claimed on the following application(s): Country: Germany, Application No.: 10 2009 045 609.0, Filed: 13 Oct. 2009, the content of which is incorporated herein by reference in its entirety.

FIELD OF THE INVENTION

The present invention is directed to a torque transmission system, particularly for a vehicle.

BACKGROUND OF THE INVENTION

Known torque transmission systems comprise a gearbox having a gearbox housing and a gearbox input shaft, a wet clutch arrangement having a housing arrangement which is filled or fillable with fluid, a first friction surface formation which is rotatable around an axis of rotation with the housing arrangement, and a second friction surface formation which is rotatable around the axis of rotation with a driven element, the housing arrangement has a hub region which engages in a shaft opening of the gearbox housing, is rotatably supported so as to be substantially fluid-tight with respect to the gearbox housing by means of a bearing/seal arrangement, and encloses the gearbox input shaft, and a fluid pump for supplying fluid to an interior space of the housing arrangement and a fluid reservoir for receiving fluid removed from the interior space of the housing arrangement are provided in the gearbox housing.

In a torque transmission system of the type mentioned above, the gearbox is in fluid exchanging communication with the wet clutch arrangement; fluid is conveyed into the interior space of the housing arrangement of the wet clutch arrangement during torque transmitting operation by the fluid pump or oil pump arranged in the gearbox, can flow around the friction surface formations therein, and is then removed from the interior space again and fed back into a fluid pan or oil pan formed in the gearbox housing for further recirculation. Because of this fluid exchanging connection existing between the gearbox and the wet clutch arrangement, the interior space of the housing arrangement gradually empties in direction of the gearbox over a longer period of disuse; fluid flows back into the gearbox from the interior space until reaching the lowest point of the fluid exchange connection in vertical direction. This lowest point generally lies in the region of the height level of the gearbox input shaft so that it can be assumed in general that approximately one half of the interior space of the housing arrangement will no longer be filled with fluid after a longer period of disuse. This can have a disadvantageous effect on subsequent restarting.

It is an object of the present invention to provide a torque transmission system, particularly for a vehicle, in which restarting problems caused by a gradual emptying of fluid from a wet clutch arrangement are prevented.

SUMMARY OF THE INVENTION

According to the present invention, this object is met by a torque transmission system, particularly for a vehicle, comprising a gearbox having a gearbox housing and a gearbox input shaft, a wet clutch arrangement having a housing arrangement which is filled or fillable with fluid, a first friction surface formation which is rotatable around an axis of rotation with the housing arrangement, and a second friction surface formation which is rotatable around the axis of rotation with a driven element, the housing arrangement has a hub region which engages in a shaft opening of the gearbox housing, is rotatably supported so as to be substantially fluid-tight with respect to the gearbox housing by means of a bearing/seal arrangement, and encloses the gearbox input shaft, and a fluid pump for supplying fluid to an interior space of the housing arrangement and a fluid reservoir for receiving fluid removed from the interior space of the housing arrangement are provided in the gearbox housing.

In this regard, it is further provided that at least one first fluid port which opens toward an intermediate space region formed between the housing arrangement and the gearbox housing is provided in the housing arrangement in or in the vicinity of the hub region, and at least one second fluid port which bypasses the bearing/seal arrangement and opens toward the intermediate space region is provided in the gearbox housing and/or in the bearing/seal arrangement.

The construction according to the invention makes it possible to determine the maximum extent to which the interior space of the housing arrangement can empty even over a longer period of disuse by specifying the positioning of the at least one second fluid port at the gearbox housing in vertical direction. Accordingly, it is also possible to create conditions for restarting which are optimized, for example, with respect to the drag torque generated by fluid interaction on the one hand and, on the other hand, with respect to a cooling effect for the friction surface formations which can already be achieved in the initial state.

For example, when the at least one second fluid port is provided in an area located above the gearbox input shaft in vertical direction, it can be ensured that an emptying of the interior space of the housing arrangement to below the height level of the gearbox input shaft will not occur.

For example, it can be provided that at least one, preferably every, second fluid port is open toward the intermediate space region at an inner opening surface surrounding the shaft opening.

In order to ensure that emptying is impeded even further, it can also be provided that at least one, preferably every, second fluid port is provided in a wall of the gearbox housing located opposite a housing shell of the housing arrangement, which housing shell is positioned on the gearbox side; for example, at least one, preferably every, second fluid port can be provided in the wall in an area located radially between the shaft opening and the friction surface formations.

When at least one, preferably every, second fluid port is arranged in a radial extension area of the friction surface formations or at least one, preferably every, second fluid port is arranged radially outwardly of the friction surface formations, the height level at which emptying can take place can be shifted even farther away from the gearbox input shaft.

In order to provide the intermediate space region in a simple manner, it is suggested that the intermediate space region is defined substantially by the gearbox housing and a closure arrangement carried thereon.

Further, fluid can be prevented from exiting the intermediate space region in that the closure arrangement is rotatably connected in a fluid-tight manner with respect to the hub region.

The flow in the interior space of the housing arrangement can be deliberately guided in direction of the at least one first fluid port in that a flow path leading to the at least one fluid port is at least partially limited in the housing arrangement by the hub region and the driven element.

Further, it can be provided that a hollow shaft engaging in the shaft opening is provided at the gearbox housing and that a flow path in the housing arrangement leading to the at least one first fluid port is at least partially limited by the hub region and the hollow shaft, and the driven element and the hollow shaft can preferably cooperate in limiting this flow space.

The wet clutch arrangement of the torque transmission system constructed according to the invention can be designed in such a way that a fluid pressure space is provided in the interior space of the housing arrangement for building up an actuating fluid pressure for a pressing element which presses the friction surface formations into frictional engagement, and that a first fluid channel is provided in the gearbox input shaft to supply the fluid pressure space with fluid under pressure which is conveyed by the fluid pump; in a variant which can be realized in a simple construction, the first fluid channel can comprise an orifice formed substantially centrally in the gearbox input shaft.

High pressures are present in the fluid pressure space region particularly when producing an engaged state by loading the pressing element with a corresponding fluid pressure over comparatively long periods of time. When the fluid pressure space is limited by the pressing element and a dividing element which is fixedly connected to the housing arrangement, the fluid pressure space can be limited without including the housing arrangement or housing shells thereof. Therefore, the pressures required for keeping the wet clutch arrangement engaged do not load the housing arrangement and cannot lead to a ballooning of the housing arrangement over the operating lifetime.

Further, it can be provided that the pressing element divides the interior space of the housing arrangement into a first space region containing the driven element and a second space region, and a second fluid channel which opens toward the first space region outside the fluid pressure space can be provided in the gearbox input shaft for generating a fluid exchange flow through the interior space of the housing arrangement.

In order to ensure that the fluid fed into the interior space flows through the interior space completely, it is further proposed that the second fluid channel opens toward the first space region in an area located axially between the dividing element and the driven element.

As was stated above, it is essential in the construction according to the invention that the extent to which the interior space of the housing arrangement of the wet clutch arrangement can empty is limited in a defined manner by defining the height position of the second fluid port or of every second fluid port. In order to reliably rule out further emptying via flow paths which are always present during torque transmitting operation, it is further proposed that a valve arrangement for preventing fluid from flowing back out of the fluid pressure space is associated with the first fluid channel and/or that a valve arrangement for preventing fluid from flowing back out of the first space region is associated with the second fluid channel.

In wet clutch arrangements, the fluid pressure required for clutch actuation is generated by the fluid pump arranged in the gearbox. For this reason, there is generally not sufficient pressure available when starting a vehicle so that torque cannot be transmitted by producing the frictional engagement between the friction surface formations until a corresponding pressure is built up. In order to prevent a delay of this kind, it is further suggested that a fluid coupling area is provided with an impeller which is rotatable around the axis of rotation with the housing arrangement and with a turbine which is rotatable around the axis of rotation with the driven element. Accordingly, the fluid coupling area can also be effective for transmitting torque between the housing arrangement and the driven element when the friction surface formations cannot be brought into frictional engagement due to insufficient fluid pressure.

In this connection, it is preferably provided that the fluid coupling area is arranged radially outwardly of the friction surface formations, preferably so as to axially overlap the latter. This ensures that the fluid coupling area can be arranged far radially outward, i.e., where the fluid still remaining is primarily collected when the interior space of the housing arrangement is partially empty during rotational operation and is accordingly also available for generating a fluid interaction between the impeller and the turbine.

BRIEF DESCRIPTION OF THE DRAWINGS

The present invention will be described more fully in the following with reference to the accompanying drawings in which.

DETAILED DESCRIPTION OF THE PRESENTLY PREFERRED EMBODIMENTS

Figure 1:
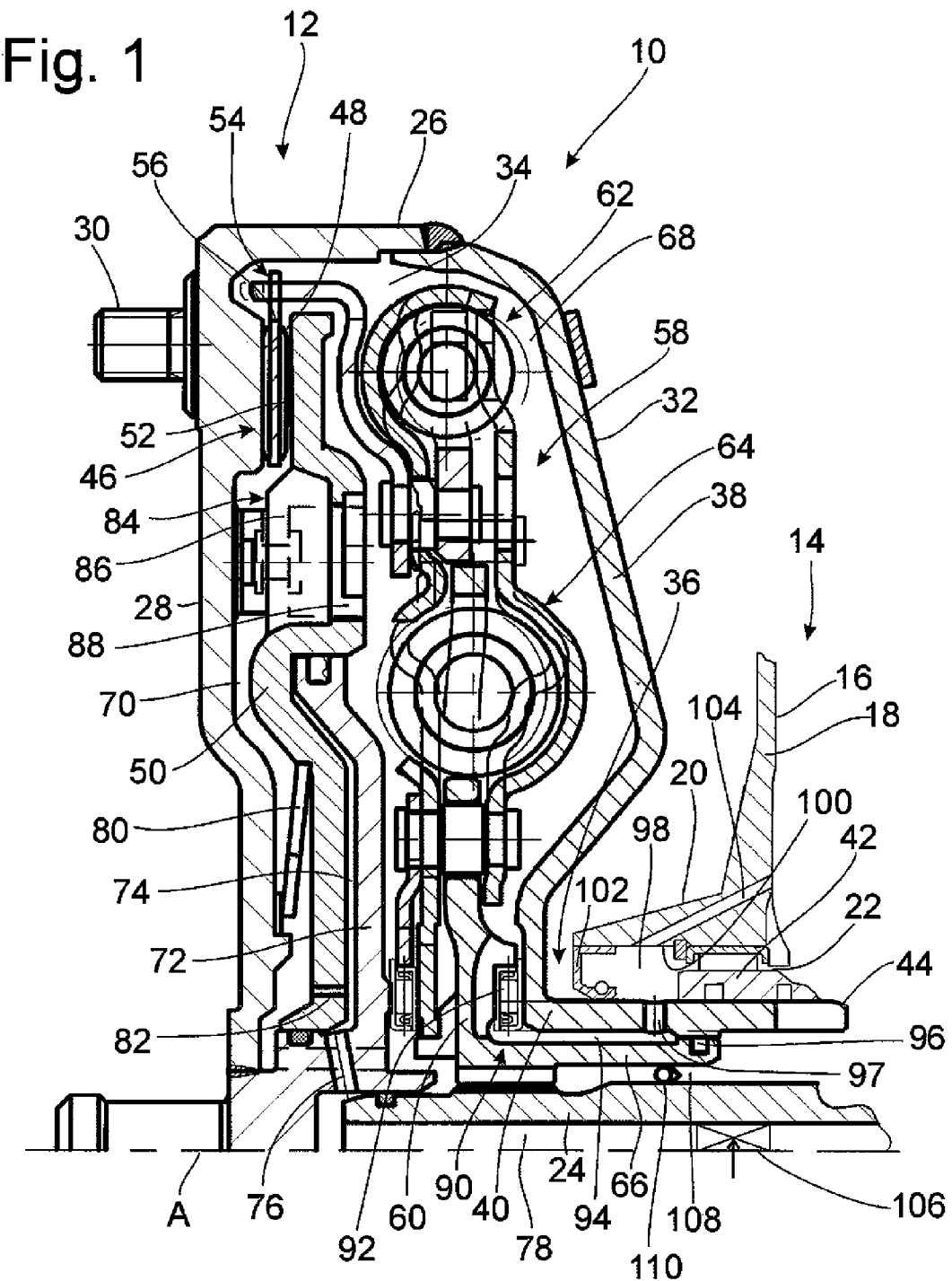
FIG. 1 is a view in partial longitudinal section through a torque transmission system of the present invention.

In FIG. 1, a torque transmission system which is usable in a power train of a vehicle is designated generally by 10. The essential components in the torque transmission 10 include a wet clutch arrangement 12 and a gearbox 14, indicated in FIG. 1 only by a portion of a gearbox housing 16 thereof, following the wheels to be driven in the torque flow of a drive unit, not shown. This gearbox housing 16 has, in a wall 18 thereof, a shaft opening 22 which is provided with an axial projection 20 and through which a gearbox input shaft 24 which also serves as driven shaft of the wet clutch arrangement 12 extends out of the gearbox housing 16 for connecting the wet clutch arrangement 12.

The wet clutch arrangement 12 comprises a housing arrangement 26 having a housing shell 28 which is to be positioned facing the engine, i.e., engine-side housing shell 28, and which can be connected to a driveshaft, for example, the crankshaft of an internal combustion engine, for rotating jointly around an axis of rotation A by means of a coupling arrangement 30 and, for example, a flexplate assembly. The housing arrangement 26 further comprises a housing shell 32 which is to be positioned facing the gearbox, i.e., gearbox-side housing shell 32, which is connected in a fluid-tight manner in its radially outer area to the engine-side housing shell 28, for example, by welding, and which, together with the latter, encloses an interior space 34 of the housing arrangement 26. Radially inwardly, the gearbox-side housing shell 32 has a hub region, designated in general by 36, which comprises a cylindrical hub projection 40 extending substantially axially away from an annular disk-shaped area 38 of the gearbox-side housing shell 32. This hub projection 40 can be integral with the disk area 38, for example, by deformation of a sheet metal blank, but can also be connected to it by welding. The hub projection 40 engages in the shaft opening 22 in the gearbox housing 16 and accordingly surrounds the gearbox input shaft 24 coaxially. The hub projection 40 and, therefore, the housing arrangement 26, are rotatably connected in a fluid-tight manner with respect to the gearbox housing 16 by a bearing/seal arrangement 42.

An end 44 of the hub projection 40 located axially remote of the disk area 38 can be formed for driving interaction with a fluid pump arranged in the gearbox housing 16. This means that when the housing arrangement 26 rotates around the axis of rotation A, the fluid pump is driven and fluid, generally transmission oil, can also be conveyed in direction of the interior space 34 from a fluid pan formed in the gearbox housing 16.

The wet clutch arrangement 12 comprises a first friction surface formation 46 which is rotatable with the housing arrangement 26 around the axis of rotation A and which has a friction surface 48 provided at the engine-side housing shell 28 and a friction surface 52 provided at a clutch piston 50 acting as pressing element. A second friction surface formation 54 comprises a plate-shaped friction element 56 which can have friction linings at its two axial sides for frictional interaction with the friction surfaces 48, 52 of the first friction surface formation 46. The friction element 56 of the second friction surface formation 54 can be clamped between the two friction surfaces 48, 52 in order to transmit torque in this way.

The second friction surface formation 54 is coupled with a driven element 60 for rotating around the axis of rotation A by means of a torsional vibration damper arrangement 58. The torsional vibration damper arrangement 58 comprises a radially outer first torsional vibration damper area 62 and, in series with the latter, a radially inner second torsional vibration damper area 64. An input area of the first torsional vibration damper area 62 is coupled with the second friction surface formation 54 for transmitting torque and comprises, for example, a central disk element which conveys the torque via damper springs to two cover disk elements which provide the output area of the first torsional vibration damper area 62. In their radially inner area, these two cover disk elements form the input area of the radially inner second torsional vibration damper area 64. The latter also conveys the torque via damper springs thereof to a central disk element which acts as output area and which can be provided by the driven element 60 or can be fixedly connected thereto. The driven element 60 is in turn connected to the gearbox input shaft 24, for example, by a spline or the like, and extends by a cylindrical projection 66 into the hub projection 40 of the hub region 36 so as to surround the gearbox input shaft 24 coaxially.

The interior space 34 of the housing arrangement 26 is divided by the clutch piston 50 into a first space region 68 which contains both the torsional vibration damper arrangement 58 and driven element 60 and a second space region 70 which is formed substantially between the clutch piston 50 and the engine-side housing shell 28. A disk-shaped dividing element 72 is arranged at the axial side of the clutch piston 50 facing the first space region 68, is fixedly connected in a fluid-tight manner in its central area to the engine-side housing shell 28, and rotatably receives in a fluid-tight manner the axial end of the gearbox input shaft 24 in a cutout which opens axially. In the radially inner area and in the radially outer area of the dividing element 72, the clutch piston 50 is connected so as to be fluid-tight but axially movable with respect to the dividing element 72. These two structural component parts define between themselves a fluid pressure space 74 which opens via one or more orifices 76 formed in the dividing element 72 into an orifice 78 formed centrally and coaxially in the gearbox input shaft 24. Fluid under pressure is fed to the orifices 76 and into the fluid pressure space 74 through this orifice 78 by the fluid pump arranged in the gearbox housing 16. As the fluid pressure increases, the restoring force provided by a pre-loading spring 80 is overcome and the clutch piston 50 is moved axially to produce the frictional engagement between the two friction surface formations 46, 54.

The construction shown in FIG. 1 is designed based on the dual-line principle with respect to the supply and removal of fluid to and from the interior space 34. This means that the fluid supply is carried out via orifice 78 and fluid pressure space 74. The latter communicates with the second space region 70 radially inwardly by means of one or more nozzle orifices 82 in the clutch piston 50. This means that owing to leakage of fluid from the fluid pressure space 74 which is initiated in a defined manner in this way, fluid conveyed by the fluid pump enters the second space region 70, flows radially outward therefrom and, flowing around the surface regions of the two friction surface formations 46, 56 which frictionally interact with one another, can proceed farther radially outward into the first space region 68. In order to ensure this circulating flow also in the engaged state, grooves can be formed, for example, in the friction linings provided at the friction element 56, which grooves bridge the friction linings radially.

This fluid circulation can be further promoted by a pump formation 84 which is formed in this case, for example, at the clutch piston 50. This pump formation 84 comprises a plurality of pumping surfaces 86 which are provided at the clutch piston 50 by axial shaped structures and which, during rotational operation, drive the fluid contained in the second space region 70 in circumferential direction and therefore subject this fluid to a centrifugal force. In the area of these shaped structures, the clutch piston 50 can also be connected, for example, by a plurality of leaf spring arrangements or the like, to the engine-side housing shell 28 so as to rotate jointly with the latter. Substantially directly radially inwardly of the two friction surface formations 46, 48, one or more orifices 88 in the clutch piston 50 form a direct connection between the two space regions 68, 70, whose cross-sectional flow area is larger than that of the nozzle orifice or nozzle orifices 82. Accordingly, under the influence of the pump formation 84, an additionally strengthened fluid circulation is generated which draws off heat from the area of the friction surface formations 46, 54 in a very efficient manner.

The fluid arriving in this way in the first space region 68 via the second space region 70 is removed again from the interior space 34 of the housing arrangement 26 via a flow path 90 which is defined radially inwardly between the gearbox-side housing shell 32, particularly the hub region 36 thereof, and the driven element 60.

This flow path leads past a bearing 92 in an annular intermediate space 94 between the cylindrical projection 66 of the driven element 60 and the hub projection 40 of the hub region 36, which bearing 92 supports the driven element 60 axially with respect to the gearbox-side housing shell 32. The cylindrical projection 66 is terminated at its axial end, for example, by an annular sealing element 96 so as to be fluid-tight with respect to the hub projection 40. A plurality of first fluid ports 97 which are distributed in circumferential direction, for example, are formed in the hub projection 40 and lead to an intermediate space region 98 located radially outwardly of the hub projection 40. This intermediate space region 98 is substantially limited between an inner opening surface 100 of the gearbox housing 16 and the outer circumferential surface of the hub projection 40. A fluid-tight closure of this intermediate space region 98 is provided on one side by the seal/bearing arrangement 42 and on the other side by a sealing element 102 which is carried, for example, on the gearbox housing 16 and which contacts the outer circumference of the hub projection 40 in a fluid-tight manner, while at the same time allowing a rotation of the hub projection 40 with respect to the gearbox housing 16.

In the present instance, a second fluid port 104 leading away from the intermediate space region 98 toward the interior space of the gearbox housing is provided in the gearbox housing 16. This second fluid port 104 is positioned in such a way that it opens toward the inner opening surface 100 and is positioned above the gearbox input shaft 24 in vertical direction.

Accordingly, the removal of fluid from the interior space 34 is carried out via the flow path 90 and the first fluid ports 97 to the intermediate space region 98 and flows back therefrom into the interior space of the gearbox housing 16 via the second fluid port 104. This flow-off connection via the second fluid port 104 ensures that even over longer periods of disuse the interior space 34 of the housing arrangement 26 can empty at most to the height level at which the second fluid port 104 opens to the interior space of the gearbox housing 16 or to the intermediate space region 98, depending on which orifice area is situated higher. A further emptying cannot take place so that the degree to which the interior space 34 remains full in all cases can be predetermined by the positioning of the second fluid port 104 in vertical direction.

In particular, since there are also other flow paths for fluid supply which produce a connection between the interior space of the gearbox housing 16 and the interior space 34 of the housing arrangement 26, it must also be ensured that no further emptying can take place via these other connections. A valve arrangement 106, indicated only schematically, can be associated with the orifice 78 in the gearbox input shaft 24; particularly also for a defined control of the engagement and disengagement of the clutch piston 50, this valve arrangement 106 can be under the control of a control device in order to electively produce a connection of the fluid pump to the fluid pressure space 74 or, for disengagement, to connect in the fluid pressure space 74, for example, to the fluid pan formed in the interior of the gearbox housing 16. When the power train is not in operation, the valve arrangement 106 can automatically change to a blocking state so that emptying cannot take place via orifice 78.

An annular intermediate space 108 formed between the outer circumference of the gearbox input shaft 24 and the inner circumference of the cylindrical projection 66 of the driven element 60 also forms a connection between the interior space 34 of the housing arrangement 26 and the interior space of the gearbox housing 16, particularly because the toothing engagement between the driven element 60 and the gearbox input shaft 24 basically produces a flow-throttling effect but not a fluid-tight closure. In order to prevent fluid from flowing out in this instance also, a valve arrangement constructed, e.g., in the form of a check valve, can be associated with this annular intermediate space. This valve arrangement could be constructed, for example, with a sealing lip or the like contacting an abutment under fluid pressure in the interior space 34 and extending in the annular intermediate space 108.

Figure 2:
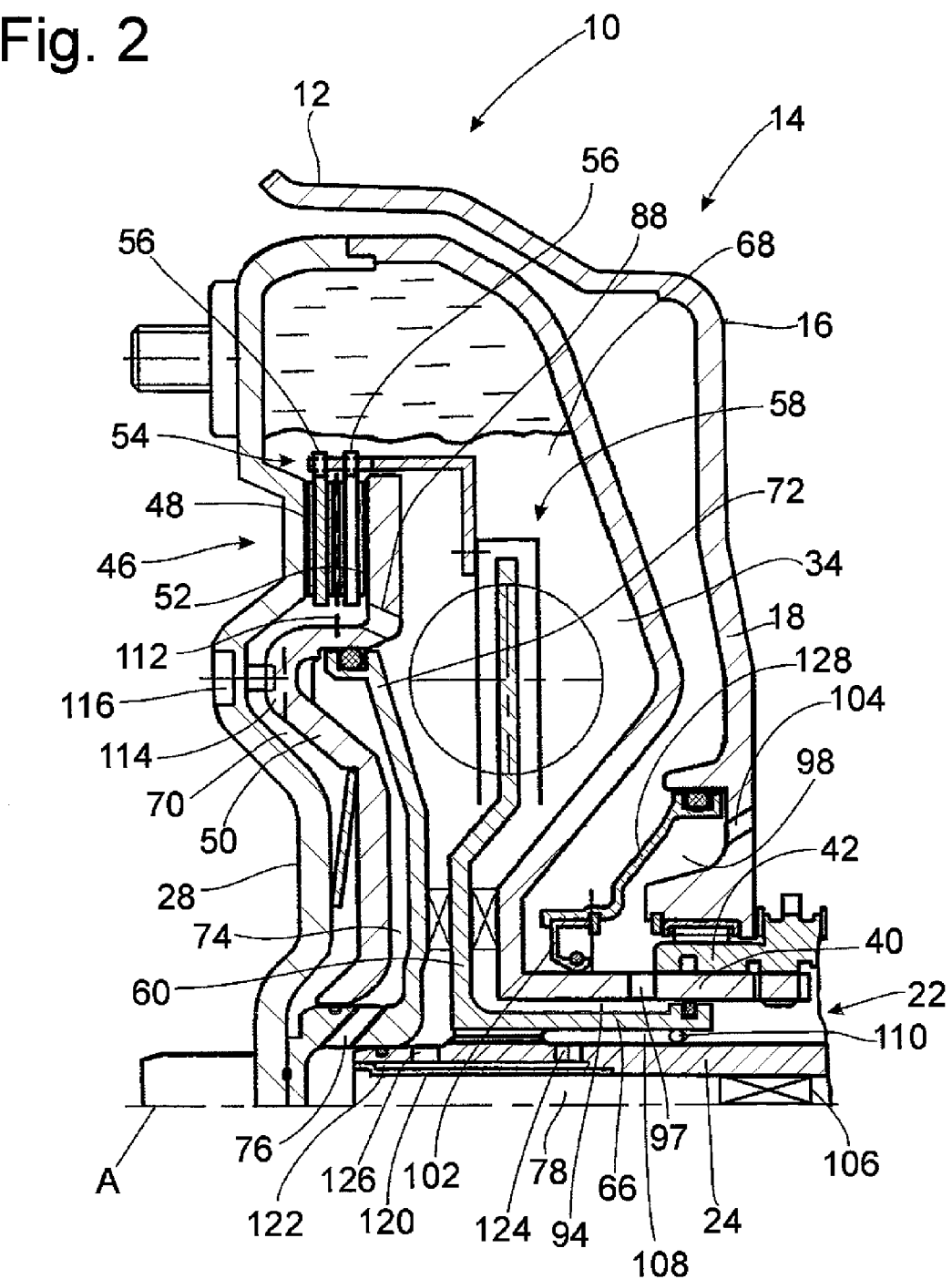
FIG. 2 is an alternative embodiment of the present invention in a view corresponding to FIG. 1.

FIG. 2 shows an alternative construction of a torque transmission system 10 according to the invention.

In this torque transmission system 10, the second friction surface formation 54 comprises two axially consecutive friction elements 56. The first friction surface formation 46 comprises, in addition to the two friction surfaces 48, 52 already mentioned, a disk-shaped friction element 112 which can be connected to the clutch piston 50 for joint rotation. Accordingly, a larger total friction surface can be achieved in this case.

By means of cutouts 114 formed at the clutch piston 50 and pressed out portions 116 formed at the engine-side housing shell 28, the clutch piston 50 is coupled with the engine-side housing shell 28 for joint rotation around the axis of rotation A. The second friction surface formation 54 is connected to the driven element 60 by the torsional vibration damper arrangement 58 which is constructed in this instance, for example, so as to have one stage.

The wet clutch arrangement 12 in this embodiment is constructed based on the dual-line principle as it is called. In this instance, there is no direct connection between the fluid pressure space 74 and the second space region 70. This means that the fluid introduced in the fluid pressure space 74 via the orifice 78 in the gearbox input shaft 24 for engagement flows back again via the orifice 78, for example, into the fluid pan formed in the gearbox housing 16, when there is a corresponding reduction in pressure for disengagement. The supply of fluid to the second space region 70 can be carried out through the orifices 88 formed directly radially inwardly of the friction surface formations 46, 54.

A fluid channel 122 which surrounds the orifice 78 coaxially is formed in the gearbox input shaft 24 for introducing fluid into the first space region 68 through a cylindrical insert part 120 partially outwardly limiting the orifice 78. This fluid channel 122 opens toward the annular intermediate space 108 between the gearbox input shaft 24 and the cylindrical projection 66 of the driven element 60 via one or more orifices 124. The fluid channel 122 opens toward the first space region 68 in an area situated axially between the dividing element 72 and the radially inner area of the driven element 60 via one or more orifices 126. Therefore, the fluid channel 122 bypasses the toothed connection between the driven element 60 and the gearbox input shaft 24 axially so that a throttle effect generated by this toothing engagement is circumvented when fluid is introduced. The majority of the fluid which is, for example, introduced into the annular intermediate space 108 by the fluid pump arranged in the gearbox housing 16 reaches the first space region 68 through the fluid channel 122. A smaller proportion passes through the toothing engagement, which is not fluid-tight, between the gearbox input shaft 24 and the driven element 60 and also enters the interior space 34 in the approximate location of the orifices 126.

In this embodiment also, the two valve arrangements 106, 110 prevent emptying of the interior space 34 below the height level of the second fluid port 104 in the stationary state. The valve arrangement 110 can also be constructed as a check valve in this case because the flow need actually only pass through the annular intermediate space 108 in one direction, namely, in the direction of the orifices 124, to generate the flow of fluid through the interior space 34.

It will be seen further from FIG. 2 that the second fluid port 104 is positioned radially farther from the axis of rotation A above the gearbox input shaft 24 in this instance, namely, in an area of the wall 18 located near the shaft opening 22. Accordingly, in this case the intermediate space region 98 extends farther radially outward and is limited substantially between the gearbox housing 16, or the wall 18 thereof, and a cap-like closure element 128. The latter is radially outwardly fixedly connected to the gearbox housing 16 in a fluid-tight manner and is radially inwardly connected to the hub projection 40 in a fluid-tight manner, for example, by means of the sealing element 102 mentioned above, and so as to permit rotation; in the embodiment shown in FIG. 1, the sealing element 102 alone provides the closure arrangement which contributes to limiting the intermediate space region 98.

Another aspect which is significant in the context of the positioning of the second fluid port 104 can be seen in the embodiment shown in FIG. 2. With the extent to which the interior space 34 empties being predetermined by the height level of the second fluid port 104, the proportion of fluid still contained in the interior space 34 collects in the radially outer area of the interior space 34 when operation is resumed. As a result of the defined presetting of the minimum filling amount now remaining, the fluid ring forming in the radially outer area does not extend radially inward up to the friction surface formations 46, 54 or to the structural component parts cooperating therewith. This means that when the rotational state commences, the friction surface formations 46, 54 are substantially not wetted with fluid and the generation of drag torque can accordingly be prevented. Therefore, insofar as it is desirable, it can be ensured that no torque is transmitted to the second friction surface formation 54 in the starting phase before gear engagement, and energy losses generated in this way can be prevented.

Figure 3:
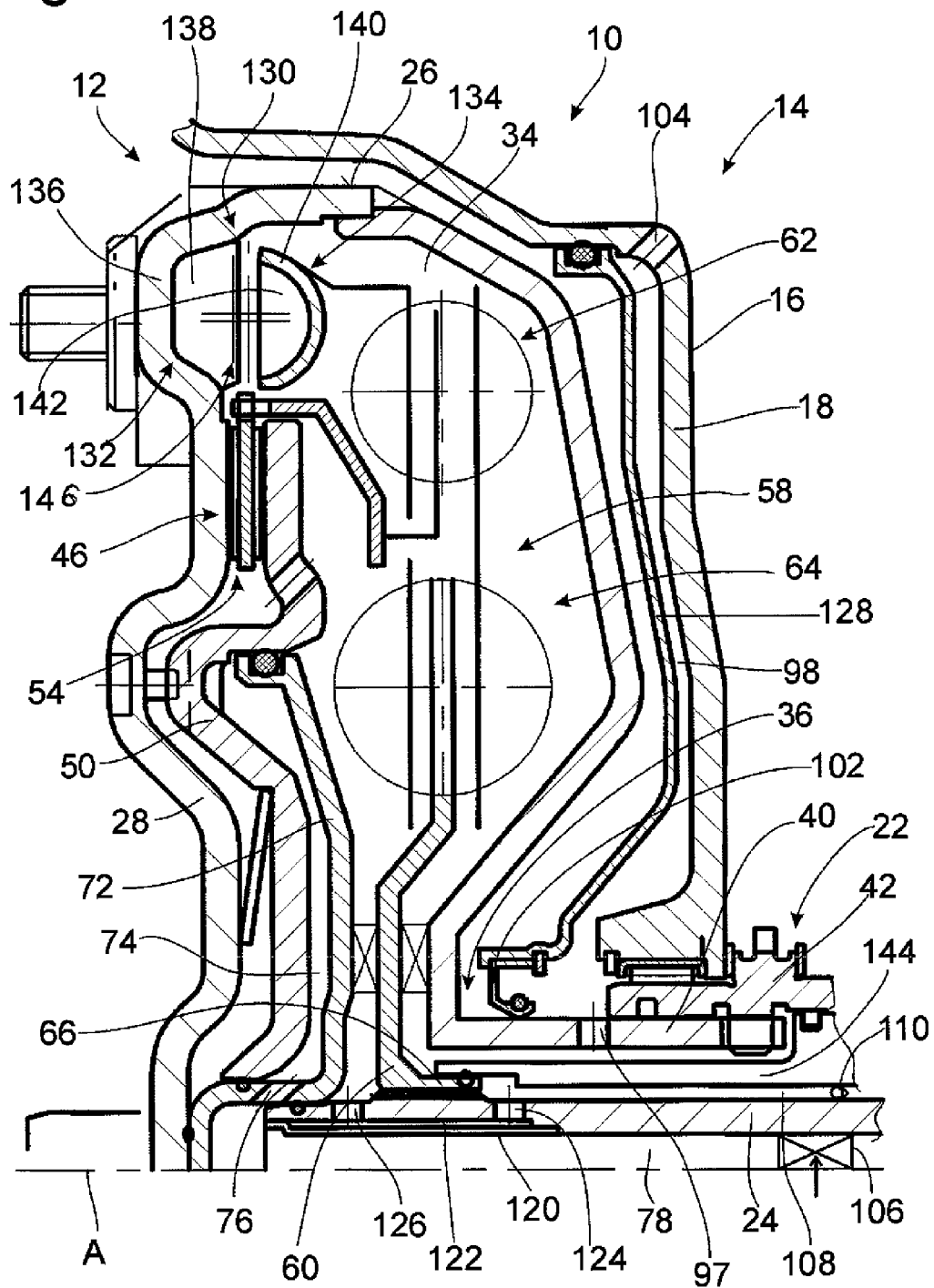
FIG. 3 is yet another alternative embodiment of the present invention in a view corresponding to FIG. 1.

Another embodiment of a torque transmission system 10 is shown in FIG. 3. In this embodiment, the wet clutch arrangement comprises a fluid coupling area 130 radially outwardly of the two friction surface formations 46, 54 and preferably axially overlapping the latter. This fluid coupling area 130 in turn comprises an impeller 132 which is rotatable with housing arrangement 26 around the axis of rotation A and a turbine 134 which is rotatable with the second friction surface formation 54 or the driven element 60 around the axis of rotation A. An impeller shell 136 of the impeller 132 is formed by the radially outer area of the engine-side housing shell 28 and carries a plurality of impeller vanes 138 arranged successively in circumferential direction. The turbine blades 142 carried at a turbine shell 140 are located axially opposite these impeller vanes 138.

The impeller 132 and turbine 134 define a fluid circulation toroidal space 146 in which a torque transmission interaction is generated by the circulation of fluid during relative rotation between the impeller 132 and the turbine 134. This means that in this embodiment, even when there is still not sufficient force available for actuating the clutch piston 50 when restarting a vehicle because fluid pressure has not yet built up in the fluid pressure space 74, a torque can be transmitted by the interaction generated in a defined manner between the impeller 132 and the turbine 134. With the gradual buildup of pressure during activation of the fluid pump arranged in the gearbox housing 16, the clutch piston 50 can then also be actuated in engagement direction so that the friction surface formations 46, 54 can also be used for transmitting torque.

FIG. 3 further shows that the turbine 134 is coupled to the output area of the radially outer first torsional vibration damper area 62 and, therefore, also to the input area of the radially inner second torsional vibration damper area 64. The second friction surface formation 54 is connected to the input area of the radially outer first torsional vibration damper area 62. The turbine 134 accordingly delivers a substantial contribution in mass to an intermediate mass located between the two torsional vibration damper areas 62, 64 so that the torsional vibration damper arrangement 46 in this case is basically constructed according to the principle of a three-mass oscillator with comparatively large intermediate mass.

A fluid guidance based on the three-line principle is also provided in this embodiment. The fluid to be introduced into the interior space 34 flows through the fluid channel 122 in the gearbox input shaft 24 and the orifices 126 radially outward into the axial area between the dividing element 72 and the driven element 60. The driven element 60 itself is constructed in this case so as to be shorter axially, i.e., the cylindrical projection 66 does not extend substantially beyond the toothed engagement area with the gearbox input shaft 24. A hollow shaft 144 is provided which lies in the shaft opening 22 of the gearbox housing 16 so as to be fixed with respect to the gearbox housing 16 and encloses the gearbox input shaft 24 concentrically. The tight connection between the hollow shaft 144 and the gearbox housing 16 can be realized, for example, by the bearing/seal arrangement 42. At its end area near the driven element 60, the hollow shaft 144 overlaps the short cylindrical projection 66 of the driven element 60 and is closed, for example, by means of a sealing element which permits rotation, in a fluid tight manner with respect to this sealing element. Accordingly, the annular intermediate space 108 is formed in this case substantially between the hollow shaft 144 and the outer circumference of the gearbox input shaft 24 and is secured against a return flow of fluid by the valve arrangement 110.

In this embodiment, the second fluid port 104 is located appreciably farther radially outward than in the embodiments described above. In particular, it will be seen that it lies on a radial or height level which approximately corresponds to the radially outer or upper end area of the wet clutch arrangement 12 and of the interior space 34. The second fluid port 104 lies radially outwardly of the friction surface formations 46, 54 and substantially also radially outwardly of, or at the radially outer area of, the fluid coupling area.

This positioning of the second fluid port 104 ensures in this case also that emptying can take place up to its height level so that, as a result, the interior space 34 is still substantially completely filled with fluid even after longer stationary periods.

It is ensured by means of the present invention that an emptying of the interior space of the housing arrangement of the wet clutch arrangement can take place only up to a height level defined by the second fluid port in the gearbox housing 16. Accordingly, depending on whether or not it is desirable to generate drag torque, the desired minimum filling amount can be determined by the position of the second fluid port 104 in vertical direction. Therefore, depending on how far away from the gearbox input shaft 24 this second fluid port is located radially outwardly or in vertical direction, it is also necessary to position the intermediate space region a corresponding distance radially outward.

It is understood that various aspects shown in the embodiment forms described above can be combined with one another. For example, each of the embodiment forms shown herein can operate on the dual-line principle or three-line principle without any regard to the height position provided for the second fluid port. Also, each of the embodiment forms shown herein can be formed optionally with or without the fluid coupling area and with or without the pump formation shown in FIG. 1. When a fluid coupling area is provided, the impeller thereof already forms an assembly which generates and promotes the fluid circulation around the friction surface formations in this way. Further, the two friction surface formations can, of course, be constructed with a greater quantity of friction elements if required. It also goes without saying that more than one second fluid port can be provided in the gearbox housing, in which case this plurality of ports are then arranged preferably, although not necessarily, at the same height level and open toward the interior space of the gearbox housing. Further, when appropriately configured, the at least second fluid port could also be provided in the bearing/seal arrangement which connects the hub region to the gearbox housing in a fluid-tight manner while nevertheless permitting a relative rotation; in this case also, it must be ensured in order to specify the height position in a defined manner that an orifice of this kind can then be provided at a stationary height, i.e., not in a rotating area.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque transmission system comprising:
   a gearbox housing (16) having a shaft opening (22);
   a gearbox input shaft (24) connected to a gearbox (14) within said gearbox housing (16);
   a wet clutch arrangement (12) including a housing arrangement (26) having an interior space (34) filled or fillable with fluid;
   a first friction surface formation (46) rotatable around an axis of rotation (A) with said housing arrangement (26);
   a second friction surface formation (54) rotatable around the axis of rotation (A) with a driven element (60) of a vibration damper;
   said housing arrangement (26) comprising a hub (40) enclosing said gearbox input shaft (24) and extending into said shaft opening (22) of said gearbox housing (16);
   a bearing/seal arrangement (42) for rotatably supporting said hub (40) so as to be substantially fluid-tight with respect to said gear box housing (16);
   said housing arrangement (26) further comprising in said hub (40) at least one first fluid port (97) in communication with said interior space (34) and an intermediate space (98) defined between said hub (40) and said gearbox housing (16); and
   at least one second fluid port (104) in communication with said intermediate space (98) and disposed in at least one of said gearbox housing (16) and said bearing/seal arrangement (42) so as to bypass said bearing/seal arrangement (42);
   wherein said friction surface formations (46, 54) have a radial extension; and said at least one second fluid port (104) is arranged radially outwardly of said radial extension of said friction surface formations (46, 54);
   said torque transmission system additionally comprising a closure arrangement (102, 128) at said gearbox housing (16) and wherein said intermediate space region (98) is bounded substantially by said gearbox housing (16) and said closure arrangement (102, 128);
   wherein said closure arrangement (102, 108) is rotatably connected in a fluid-tight manner with respect to said hub region (36); and
   additionally comprising a flow path (90) leading to said at least one first fluid port (97), said flow path at least partially defined in the housing arrangement (26) by said hub (40) and said driven element (60).

2. The torque transmission system according to claim 1, wherein said at least one second fluid port (104) is disposed in an area located above said gearbox input shaft (24) in vertical direction.

3. The torque transmission system according to claim 1, wherein said intermediate space region (98) comprises an inner opening surface (100) surrounding said shaft opening (22) and wherein said at least one second fluid port (104) is open toward said inner opening surface (100).

4. The torque transmission system according to claim 1, wherein said gearbox housing (16) comprises a wall (18) and said housing arrangement (26) comprises a housing shell (32) opposite said gearbox housing (16) and wherein said at least one second fluid port (104) is located in said wall (18) of said gearbox housing (16) opposite said housing shell (32) of said housing arrangement (26).

5. The torque transmission system according to claim 4, wherein said at least one second fluid port (104) is located in said wall (18) in an area located radially between said shaft opening (22) and said friction surface formations (46, 54).

6. The torque transmission system according to claim 1, additionally comprising a hollow shaft (144) extending into said shaft opening (22) at said gearbox housing (16); and a flow path (90) leading to said at least one first fluid port (97) at least partially defined by said hub region (36) and said hollow shaft (144).

7. The torque transmission system according to claim 1, additionally comprising a pressing element (50); a fluid pressure space (74) and a first fluid channel (78); said fluid pressure space (74) being provided in said interior space (34) of said housing arrangement (26) for building up an actuating fluid pressure for said pressing element (50) for pressing said friction surface formations (46, 54) into frictional engagement; said first fluid channel (78) being provided in said gearbox input shaft (24) to supply said fluid pressure space (74) with pressurized fluid.

8. The torque transmission system according to claim 7, wherein said first fluid channel (78) comprises an orifice (78) formed substantially centrally in said gearbox input shaft (24).

9. The torque transmission system according to claim 7, additionally comprising a dividing element (72) fixedly connected to said housing arrangement (26); and wherein said fluid pressure space (74) is limited by said pressing element (50) and said dividing element (72).

10. The torque transmission system according to claim 7, wherein said pressing element (50) divides said interior space (34) of said housing arrangement (26) into a first space region (68) containing said driven element (60) and a second space region (70).

11. The torque transmission system according to claim 10, wherein said gearbox input shaft (24) additionally comprises a second fluid channel (122) opening toward a first space region (68) outside said fluid pressure space (74).

12. The torque transmission system according to claim 9, wherein said second fluid channel (122) opens toward a first space region (68) in an area located axially between said dividing element (72) and said driven element (60).

13. The torque transmission system according to claim 7, additionally comprising a first valve arrangement (106) and second valve arrangement (110) and wherein at least one of said first and second valve arrangements is constructed for one of preventing fluid from flowing back out of said fluid pressure space (74) associated with said first fluid channel (78) and preventing fluid from flowing back out of a first space region (68) associated with said second fluid channel (122).

14. The torque transmission system according to claim 1, additionally comprising a fluid coupling area (130) including an impeller (132) rotatable around the axis of rotation (A) with said housing arrangement (26) and a turbine (134) rotatable around the axis of rotation (A) with said driven element (60).

15. The torque transmission system according to claim 14, wherein said fluid coupling area (130) is arranged radially outwardly of said friction surface formations (46, 54).

\* \* \* \* \*